United States Patent [19]

Todor et al.

[11] Patent Number: 5,692,623

[45] Date of Patent: Dec. 2, 1997

[54] STORAGE ARRAY FOR PRESENTING TAPE MEDIA OF DIFFERING DIMENSIONS TO A ROBOTIC ARM AT A COMMON DATUM

[75] Inventors: John S. Todor, Arvada; Matthew P. Wojciechowski, Louisville; David Trachy, Niwot, all of Colo.

[73] Assignee: Storage Technology Corporation, Louisville, Colo.

[21] Appl. No.: 575,628

[22] Filed: Dec. 20, 1995

[51] Int. Cl.⁶ ............................................. G11B 23/023
[52] U.S. Cl. ................ 211/41; 206/387.14; 206/387.15; 206/307.1; 360/94
[58] Field of Search .............. 211/40, 41; 206/387.14, 206/387.15, 387.1, 307.1; 360/94; 312/9.9, 9.51, 9.53, 9.54, 9.47, 9.48

[56] References Cited

U.S. PATENT DOCUMENTS

| | | | |
|---|---|---|---|
| 3,907,116 | 9/1975 | Wolf et al. | 211/40 |
| 4,440,458 | 4/1984 | Berkman | 206/387.14 |
| 4,889,244 | 12/1989 | Hehn et al. | 211/40 |
| 4,960,205 | 10/1990 | Wang | 206/307.1 |
| 5,016,127 | 5/1991 | Inoue et al. | 360/94 |

FOREIGN PATENT DOCUMENTS

2223218  4/1990  United Kingdom ............... 211/41

*Primary Examiner*—Leslie A. Braun
*Assistant Examiner*—Donald J. Wallace
*Attorney, Agent, or Firm*—Duft, Graziano & Forest, P.C.

[57] ABSTRACT

A multimedia array (100) is formed from a plurality of compartments (102, 104) that are capable of receiving differently sized cartridges (30, 50, 70) for presentment to a robotic arm (166). The compartments each include a sidewall ramp (150) for use in centering the cartridges in the compartments, and a rearward boss (134) for positioning forward surfaces (32, 52, 72) of the respective cartridges equidistantly (at distance D) from the forwardmost surface (114) of the compartments.

18 Claims, 5 Drawing Sheets

STORAGE ARRAY FOR PRESENTING TAPE MEDIA OF DIFFERING DIMENSIONS TO A ROBOTIC ARM AT A COMMON DATUM

BACKGROUND OF THE INVENTION

Field of the Invention

The present invention pertains to the field of storage apparatus for computer data cartridges in robotic cartridge library systems. More specifically, the cartridge storage apparatus includes a multimedia storage compartment that can be used to store a variety of cartridges having different sizes for presentment to a robotic arm at a datum that is shared by all of the cartridges.

PROBLEM

Robotic tape library systems use a robotic arm to transfer data cartridges between cartridge storage racks and tape drives that are used to read, write, and erase data that is stored on the tapes. The robotic arm removes a cartridge from a compartment or bay where the cartridge is stored, and inserts the cartridge into an appropriate tape drive. The robotic arm removes the cartridge from the tape drive at the appropriate time, and returns the cartridge to a compartment for storage. The storage compartment has exacting dimensions that correspond to the cartridge because the cartridge must be positioned in a precise manner if the robotic arm is to grasp the cartridge without mishap.

Robotic tape library systems provide relatively low cost access to a large amount of information. An example of this type of system includes the 4400 ACS system, which is commercially available from Storage Technology Corporation of Longmont, Colo.

Different hardware manufacturers have independently developed tape cartridges and corresponding tape drive mechanisms having dimensions that are unique to each manufacturer. The different styles of cartridges must be used in a drive that conforms to the cartridge, i.e., the cartridges are not interchangeable among the different styles of drives. The cartridges can include those that correspond to ANSI specifications, as well as cartridges that are not defined in ANSI specifications. The discussion of FIGS. 1-3 below provides a comparison between three different tape cartridge designs.

Figure 1:
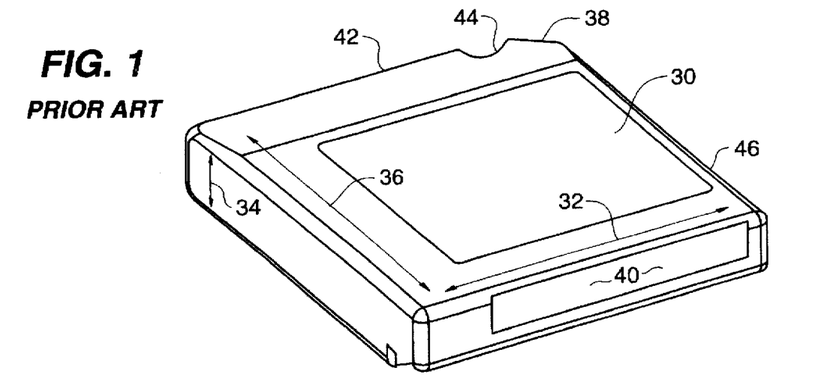
FIG. 1 depicts a left front elevational perspective view of a first cartridge having a unique design with respect to other types of cartridges.

FIG. 1 depicts cartridge 30, which is a conventional IBM 3480 cartridge manufactured according to ANSI specifications. Cartridge 30 has a width dimension following arrow 32 of approximately 4.25 inches, a height dimension following arrow 34 of approximately 0.965 inches (1.004 inches including ski features on the bottom cartridge surface), and a depth dimension following arrow 36 of approximately 4.875 inches. Cartridge 30 has a corner bevel 38 where a standard leader block (not depicted) is used to pull tape from inside cartridge 30. Cartridge 30 presents a forward surface 40 that is remote from a rearward surface 42 having an arcuate notch 44 proximal to bevel 38. Cartridge 30 is circumscribed at its upper and lower perimeter by respective rounded edges, e.g., edge 46.

Figure 2:
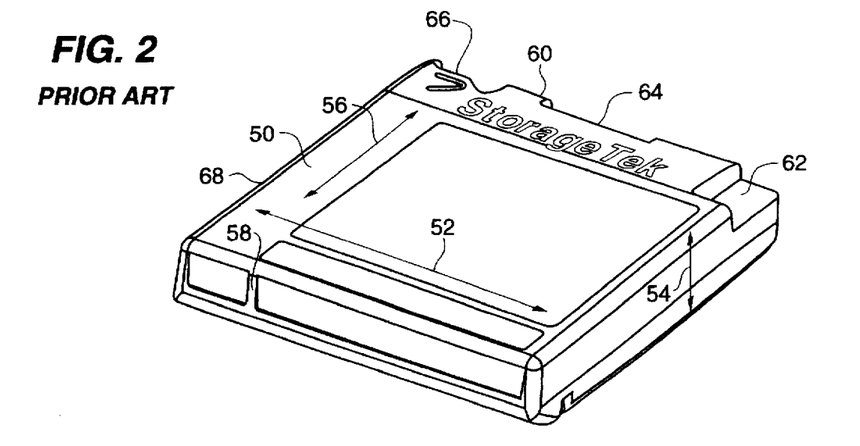
FIG. 2 depicts a right front elevational perspective view of a second cartridge having a design that is different from the FIG. 1 cartridge.

FIG. 2 depicts a 4400 ACS cartridge 50 that is produced according to standards promulgated by Storage Technology Corporation of Longmont, Colo. Cartridge 50 has a width dimension following line 52 of approximately 4.291 inches, a height dimension following line 54 of approximately 0.965 inches (1.004 inches including ski features on the bottom cartridge surface), and a depth dimension following line 56 of approximately 4.921 inches. Cartridge 50 presents a forward surface 58 that is remote from rearward surface 60. Cartridge 50 includes a rearward, generally rectangular notch 62 having a lesser overall height than does the remainder of cartridge 50, and a central rearward recess 64. A leader block (not depicted) is used to draw tape from a rearward opening in cartridge 50 proximal to reference numeral 66. Cartridge 50 is circumscribed by rounded upper and lower edges, e.g., upper rounded edge 68.

Figure 3:
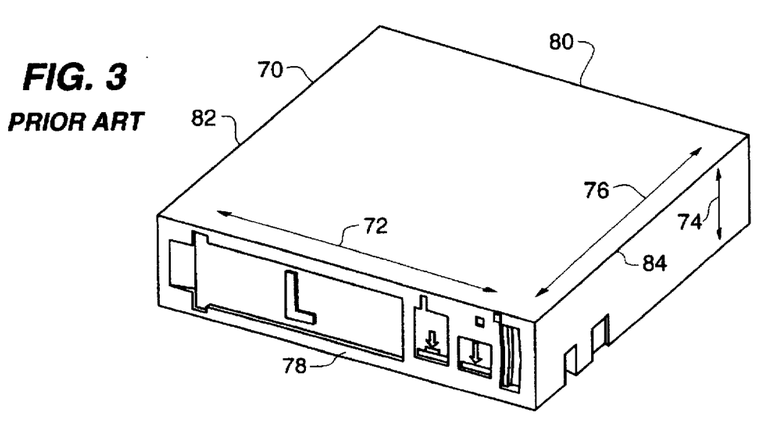
FIG. 3 depicts a right front elevational perspective view of a third cartridge having a design that is different from the first cartridge and the second cartridge.

FIG. 3 depicts a cartridge 70 that is used in conjunction with digital linear tracking tape drives manufactured by Quantum Corporation of Shrewsburg, Mass. Cartridge 70 has a width dimension following line 72 of approximately 4.150 inches, a height dimension following line 74 of approximately 1 inch, and a depth dimensions following line 76 of approximately 4.165 inches. Cartridge 70 presents a forward surface 78 at a position remote from rearward surface 80. Cartridge 70 has a slidable side door proximal to reference numeral 82 that can be actuated to provide access to tape that is spooled within cartridge 70. Cartridge 70 is circumscribed by square corners, e.g., upper square corner 84.

The owner of a tape library system may wish to use a variety of different cartridges like those of FIGS. 1-3 in a single library system. This need can arise where the cartridges must be periodically removed from the tape library system for use in another tape library system having compatibility with a single type of tape. Additionally, this need can arise where the owner is combining tapes from a variety of different library systems, or the tapes are purchased from different suppliers that use different cartridge styles. A need for mixing cartridges of different design can also arise where the act of copying data from one tape to another would constitute a breach of contract or a copyright violation. The system owner may also wish to have the option of using different cartridges for the purposes to which the owner's existing inventory of cartridges and corresponding drive mechanisms are best suited, e.g., high speed for large video images and accuracy for accounting information.

The data library system can be provided with a plurality of tape drive mechanisms that accommodate tapes of different design. The drives are placed as normal drives in the library system, and operably connected to the host computer for data transfer. The computer can be programmed to move the robotic arm in a manner that is effective for inserting and removing tapes from the respective drives.

Significant problems are associated with using a single tape storage compartment to store tape cartridges having different dimensions, such as the cartridges depicted in FIGS. 1-3. Conventional robotic arms use a robotic eye to align the robotic arm with a target on a specific tape storage compartment. The tape must be precisely positioned within the compartment because a misalignment between the robotic arm and the cartridge can cause a transfer failure. More specifically, cartridges having different width dimensions cannot be centered in the storage compartment and with respect to the arm because the tape-holding compartment is incapable of centering cartridges of different widths. Cartridges having different depths also extend forwardly, if at all, from the compartment at different distances because the compartment depth limits are not adjustable.

Variations in the storage position of the cartridge can cause catastrophic malfunctions in the robotic arm. A robotic arm attempting to insert a miscentered cartridge into a tape drive may catch an edge of the cartridge on an edge of the drive. The torsion encountered when the arm attempts to push the cartridge into the drive can twist the cartridge sideways or even cause the cartridge to drop from the robotic arm. In circumstances where the forward surface of the cartridge fails to extend a sufficient distance forward from the compartment, the robotic arm may not be able to grasp the cartridge or may only be able to obtain a precarious grasp that presents a risk of dropping the cartridge.

One solution to the problem would be to provide a fixed number of cartridge storage bays for each type of cartridge. This solution is undesirable because each library system would have to be specially provided with fixed numbers of storage bays corresponding to the system owner's needs, and these needs could change over the life of the library system. Thus, a need for continual maintenance and refitting would arise. Mass production of the library systems would also be complicated because the control software would have to be specially written for each library system. This control software would have to be modified each time the library system is retrofitted with different numbers of unique storage compartments allocated to the respective cartridges.

A true need exists for a universal cartridge storage compartment that can be used to store different cartridges, such as those depicted in FIGS. 1–3.

SOLUTION

The present invention overcomes the problems that are outlined above by providing a multimedia array having a universal cartridge storage compartment. The compartment can be used to store multiple types of cartridges for eventual access by a robotic arm. The storage compartment is capable of centering the respective cartridges along a width dimension, positioning the cartridges to a uniform distance forward from the compartment, and adjusting the center of the cartridges to a uniform height. The compartment advantageously accomplishes these objectives through the use of gravitational forces without the provision of any moving parts on the compartment. The compartment accomplishes this alignment through the use of various raised features that interfit with design features which are unique to each cartridge.

In broad terminology, the invention pertains to a specialized compartment that is used in a multimedia array to align a plurality of differently sized cartridges for presentation to a robotic arm. The array includes at least one cartridge-receiving compartment. The compartment also includes a first means for aligning a first cartridge in at least two dimensions with respect to the compartment. The compartment also includes a second means for aligning a second cartridge in the same two dimensions with respect to the compartment. The first and second cartridges differ from one another in at least one of the two dimensions. These two dimensions can include, for example, height, width, and depth dimensions. The compartment is also capable of aligning the cartridge in three dimensions with respect to the compartment. The preferred compartment preferably has no moving parts, and is oriented in a manner that permits gravitational forces to align the cartridge using the compartment surfaces as guides.

The first and second means of alignment preferably each include sidewalls of the compartment having a ramp leading downward towards the bottom center of the compartment. This ramp is preferably an arcuate surface having a low coefficient of friction with the cartridge (e.g., plastic on plastic) that permits gravity to guide the cartridge along the ramp for centering of the cartridge with respect to the corresponding width dimensions of the compartment and the cartridge. The preferred centering ramp accounts for one dimension of alignment when the first and second cartridges differ from one another in their respective width dimensions.

The first and second means of alignment also preferably each include a rear wall of the compartment having a raised boss that permits receipt of one of the first and second cartridges to a certain depth within the compartment without contacting the boss. The other cartridge preferably has a design feature that abuts the boss to permit passage of the cartridge within the compartment to a lesser depth when the first and second cartridges differ from one another in their depth dimensions. Thus, the first and second means can interact with design features that are unique to each cartridge design. The compartment can also include means for aligning a third cartridge in two dimensions with respect to the forwardmost surface. The third cartridge can differ from the first cartridge in at least one of the two dimensions, and it can differ from the second cartridge in the other dimension.

The multimedia array preferably includes a plurality of these compartments. The compartments are preferably connected in fixed relationship to one another. The fixed relationship preferably positions the respective cartridges that are received within each compartment along a common datum line. The datum line represents a distance in space forward from the forwardmost surfaces of the respective cartridges. The cartridges extend forward from their compartments a sufficient distance to place forward surfaces of the cartridges in contact with the datum line. The cartridges are also centered with respect to the datum line along the width dimensions of the respective cartridges.

These and other salient feature, objects, and advantages of the multimedia array will be apparent to those skilled in the art upon a reading of the discussion below in combination with the accompanying drawings.

BRIEF DESCRIPTION OF THE DRAWINGS

FIG. depicts a top plan view of the FIG. 4 multimedia array having the cartridge of FIG. 3 inserted into the compartment of FIG. 6.

DETAILED DESCRIPTION OF THE PREFERRED EMBODIMENT

Figure 4:
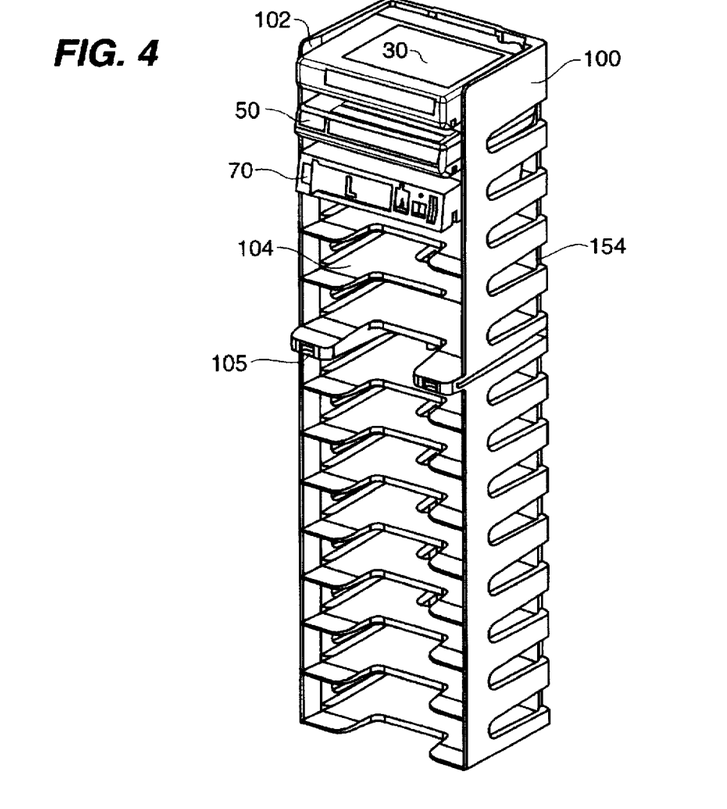
FIG. 4 depicts a right front elevational perspective view of a multimedia array according to the present invention, wherein the respective cartridges of FIGS. 1–3 received in different compartments of the array.

FIG. 4 depicts a multimedia array 100 having a plurality of essentially identical compartments, e.g., compartments 102 and 104 that can be interchangeably used to store any of the cartridges depicted in FIGS. 1–3. Array 100 is preferably formed as a single piece of injection molded synthetic resin. Compartment 102 is depicted as holding cartridge 30. Other compartments are used to retain cartridges 50 and 70. The positions of cartridges 30, 50, and 70 may be interchanged in their respective compartments. Array 100 also includes a conventional target 105 that may be accessed by a robotic eye.

Figure 5:
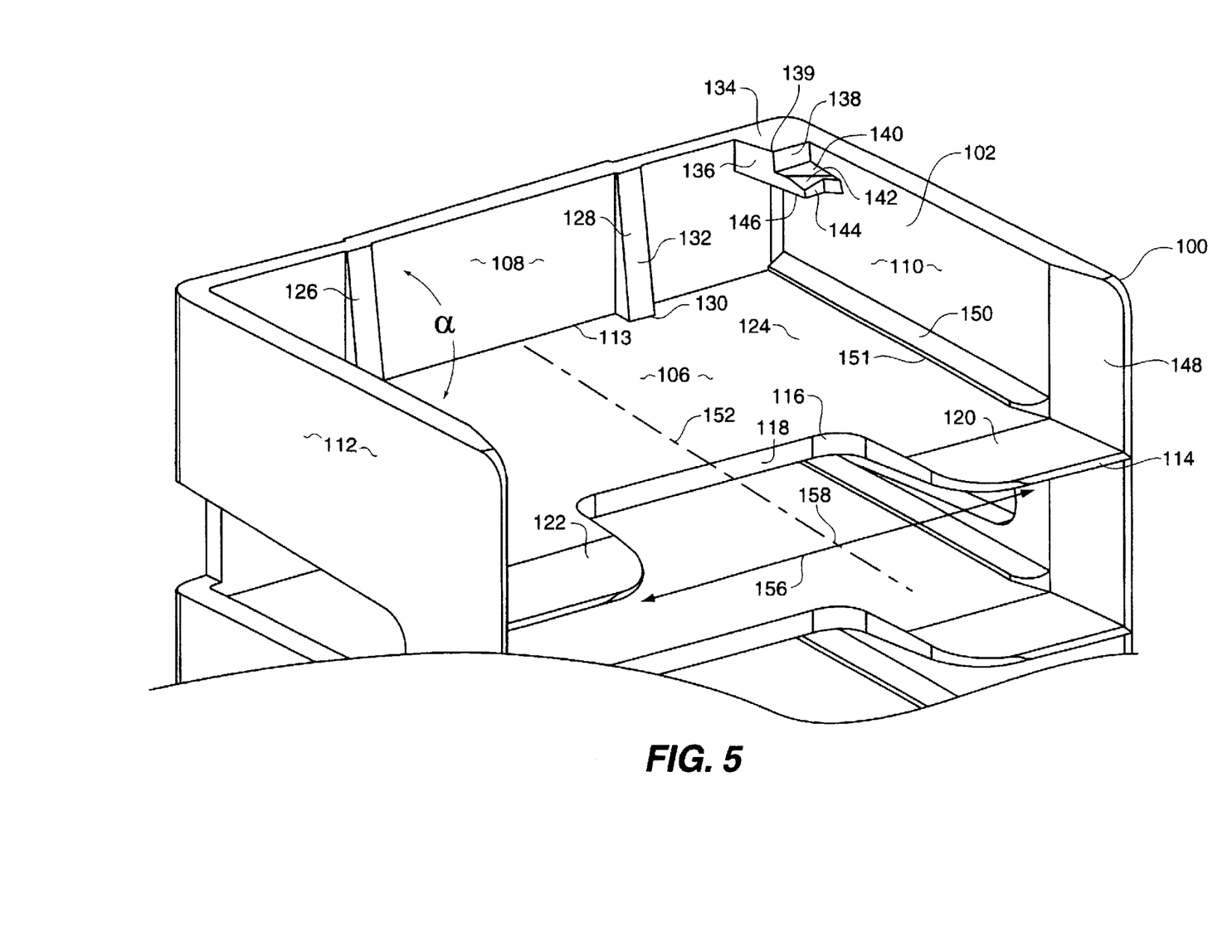
FIG. 5 depicts a partial left front elevational perspective view of the FIG. 4 multimedia array showing compartment with the cartridges removed.

FIG. 5 depicts compartment 102 in more detail as a left front perspective elevational view. Compartment 102 differs from the other compartments of array 100 in that no other compartment exists directly above compartment 102. The major features of compartment 102 include floor 106, rear wall 108, and sidewalls 110 and 112.

Floor 106 joins rear wall 108 along line 113, and extends forward from rear wall 108 to a forwardmost surface 114. The forward central zone of floor 106 includes a central channel 116 that is formed of a bight 118 connecting beveled cartridge-guiding wings 120 and 122. Bight 118 has dimensions that permit a robotic arm to pass between wings 120 and 122. The respective bevels on each of wings 120 and 122 narrow in a forward direction to slope away from the planar uppermost surface 124 of floor 106. Floor 106 is preferably positioned at a rearwardly sloping angle with respect to rear wall 108. More specifically, angle α preferably ranges from 70° to 85°, with the most preferred angle being 80°.

Rear wall 108 includes a pair of upwardly tapering wedges 126 and 128. The bottom of each wedge, e.g., bottom 130, meets uppermost surface 124 at a right angle to provide an upwardly elongated cartridge abutment surface 132 that is squared with respect to surface 124.

Cartridge-contacting boss 134 extends forward from rear wall 108. Boss 134 includes a thick rearward block segment 136 that drops along face 138 to present corner 139 leading down to a narrowed forward finger portion 140. Finger portion 140 includes a forwardly sloped bevel 142 that meets a forward angular cartridge-contacting surface 144. The underside or lower surface 146 of boss 134 is preferably a smooth a planar surface that runs parallel with uppermost surface 124 of floor 106.

Sidewall 110 extends forward from rear wall 108 in a perpendicular orientation relative to floor 106. Sidewall 110 is integrally formed with segment 136 and finger 140 of boss 134. The forward marginal zone of sidewall 110 tapers forwardly to form a cartridge guiding surface as sidewall bevel 148. The bottom of sidewall 110 includes an arcuate cartridge centering ramp 150 that extends from rear wall 108 to the beginning of bevel 148. Ramp 150 tapers downward towards centerline 152 (which is drawn along surface 124) and drops straight down to surface 124 across stairstep face 151. Sidewall 112 is a mirror image of sidewall 110, except sidewall 112 is not integrally formed with boss 134. Sidewalls 110 and 112 may optionally be provided with openings, e.g., opening 154 of the compartment 104 directly beneath compartment 102.

Forwardmost surface 114 of compartment 102 has a width dimension along line 156 that intersects centerline 152 at point 158.

Figure 6:
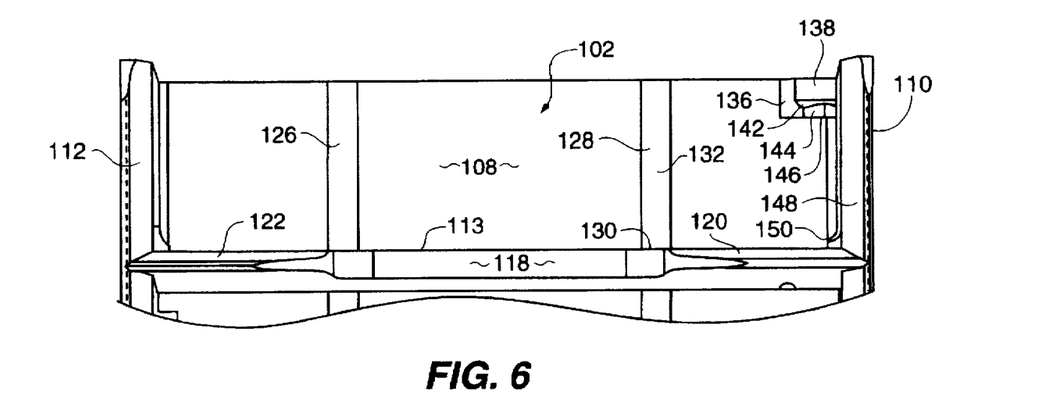
FIG. 6 depicts a front elevational view of a compartment of the FIG. 4 multimedia array.

FIG. 6 depicts compartment 102 from a front elevational perspective that is viewed perpendicularly with respect to uppermost surface 124 of FIG. 5. This perspective shows that boss 134 tapers forwardly along side surface 158 from rear wall 108 towards sidewall 110.

Figure 7:
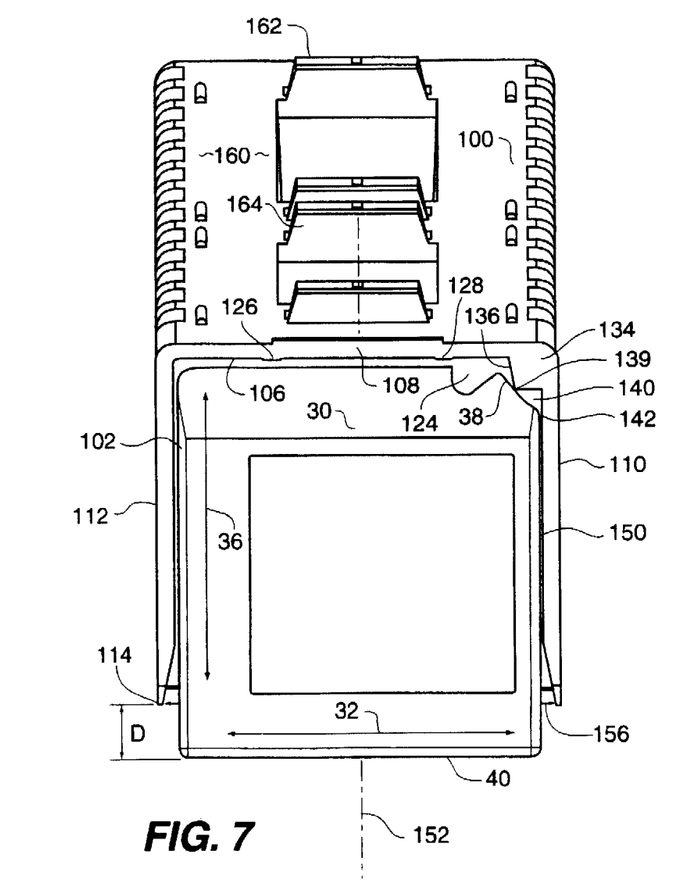
FIG. 7 depicts a top plan view of the FIG. 4 multimedia array having the cartridge of FIG. 1 inserted into the compartment of FIG. 6.

FIG. 7 depicts a top plan view of multimedia array 100 with cartridge 30 of FIG. 1 positioned within compartment 102. The FIG. 7 perspective is taken from a position that is perpendicular to uppermost surface 124 and cartridge 30. Several contact surfaces exist between compartment 102 and cartridge 30. The lower perimeter of cartridge 30 rests on the ramp surfaces (e.g., ramp 150) of sidewalls 110 and 112 to center the width dimension 32 of cartridge 30 along centerline 152 and with respect to the width dimension 156 of compartment 102. Bevel 142 of finger 140 on boss 134 slips underneath bevel 38 of cartridge 30 to permit contact between bevel 38 and corner 139. This contact serves to retain cartridge 30 in spaced relationship apart from rearward wall 108 as well as rearward wedges 126 and 128. This spaced relationship places forwardmost surface 40 of cartridge 30 a fixed distance D apart from forwardmost surface 114 of compartment 102.

FIG. 7 reveals a rearward wall of multimedia array 100. Wall 160 includes a plurality of rearwardly extending downwardly curved hooks, e.g., hooks 162 and 164. These hooks are used to hang array 100 from a supportive structure wall (not depicted) in the tape library system where array 100 is used.

Figure 8:
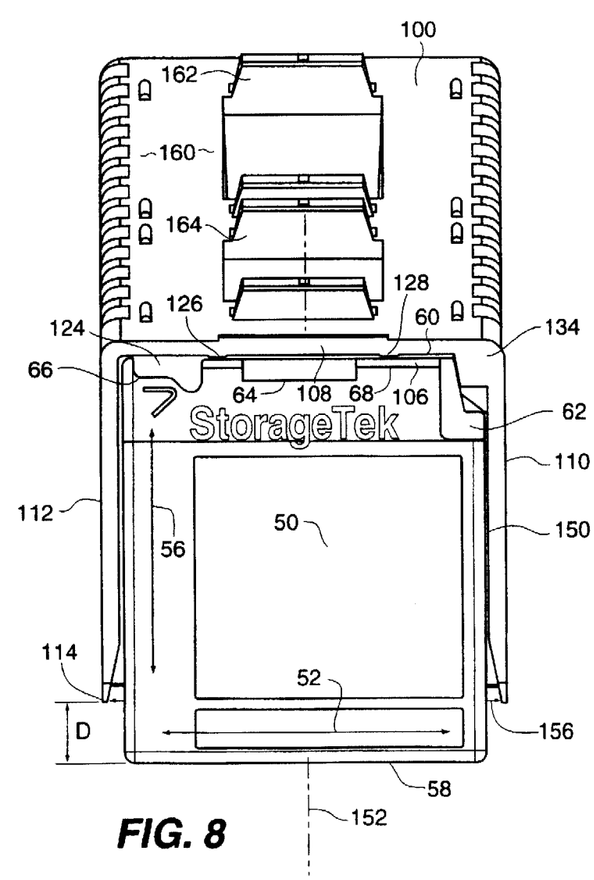
FIG. 8 depicts a top plan view of the FIG. 4 multimedia array having the cartridge of FIG. 2 inserted into the compartment of FIG. 6.

FIG. 8 depicts a top plan view of multimedia array 100 with cartridge 50 of FIG. 2 positioned within compartment 102. The FIG. 8 perspective is taken from a position that is perpendicular to uppermost surface 124 and cartridge 50. Several contact surfaces exist between compartment 102 and cartridge 50. The lower perimeter of cartridge 50 rests on the ramp surfaces (e.g., ramp 150) of sidewalls 110 and 112 to center the width dimension 52 of cartridge 50 with respect to centerline 152 and the width dimension 156 of compartment 102. Recess 62 of cartridge 50 slips beneath boss 134 to place the rearward surface 60 of cartridge 50 in contact with ramps 126 and 128 of rear wall 108. This contact serves to position forward surface 58 of cartridge 50 a fixed distance D apart from forwardmost surface 114 of compartment 102. This distance D equals the distance D of FIG. 7.

Figure 9:
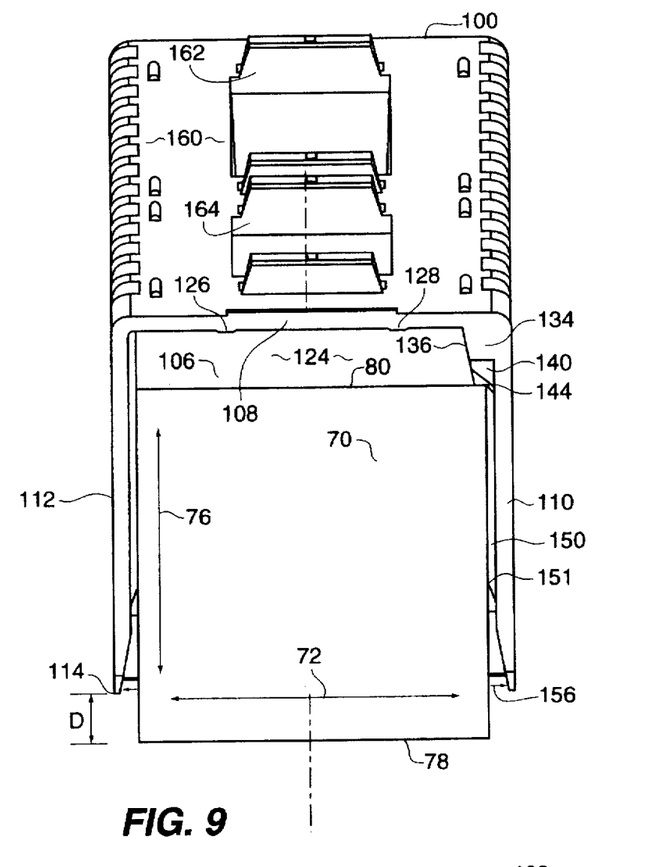

FIG. 9 depicts a top plan view of multimedia array 100 with cartridge 70 of FIG. 3 positioned within compartment 102. The FIG. 9 perspective is from a position that is perpendicular to uppermost surface 124 and cartridge 70. Several contact surfaces exist between compartment 102 and cartridge 70. The lower perimeter of cartridge 70 rests on the uppermost surface 124 of floor 106 inboard of the sidewall ramps, e.g., ramp 150 including face 151 as shown in FIGS. 5 and 9. This position places cartridge 70 between the respective sidewall ramps with almost no tolerance to center the width dimension 72 of cartridge 70 with respect to centerline 152 and the width dimension 102 of compartment 156. Rearward surface 80 of cartridge 70 touches contact surface 144 on finger 140 of boss 134 to position forward surface 78 of cartridge 70 a fixed distance D apart from forwardmost surface 114 of compartment 102. This distance D equals the distance D of FIGS. 7 and 8.

The height dimensions of cartridges 30 and 50 are approximately equal, but these dimensions differ from the height dimension of cartridge 70. In FIG. 9, the center of the height dimension 74 (see FIG. 3) for cartridge 70 is located at precisely the same position relative to compartment 102 as are the respective height dimension centers for dimension 54 (FIG. 2) of cartridge 50 and dimension 34 (FIG. 1) of cartridge 30. Therefore, the stairstep face 151 of ramp 150 serves to align cartridge 70 in a third dimension with respect to compartment 102.

Figure 10:
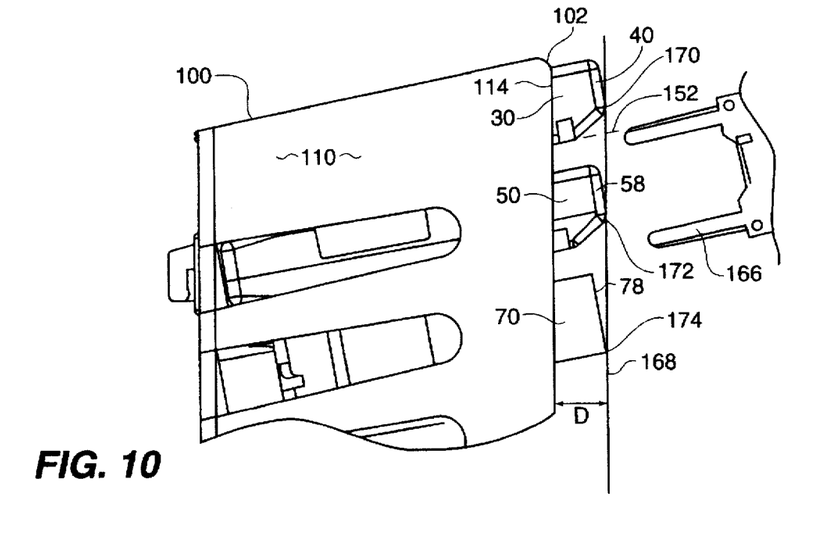
FIG. 10 depicts a partial left side elevational view of the FIG. 4 multimedia array with the cartridges of FIGS. 1–3 inserted into respective compartments of the array for presentment along a common datum line to a robotic arm.

FIG. 10 depicts a side elevational view of multimedia array 100 having cartridges 30, 50, and 70 placed in respective compartments like compartment 102. A robotic arm 166 is in position to begin rearward movement for grasping of cartridge 50. The respective forwardmost surfaces 40, 58, and 78 of the cartridges touch datum line 168, which represents a distance D spaced apart from the centers of the width dimensions of the respective compartments. Thus, datum line 168 also extends between respective datum points on each cartridge, i.e., datum points 170, 172, and 174, which represent the center of the width dimension of their corresponding for, ward surfaces at a distance D from the forwardmost surface of their corresponding compartments.

In operation, hooks 162 and 164 of multimedia array 100 are used to hang the array on a wall of a conventional data cartridge library system. Robotic arm 166 is used to transfer the cartridges between their respective compartments, such as compartment 102, and tape drive mechanisms that correspond to the cartridges. Robotic arm 166 removes the cartridges from the drive mechanism, and can transfer the cartridges to any storage compartment in the array where gravitational forces operate to adjust the position of the cartridge in the compartment. It is noted that each cartridge typically has a home storage compartment that is allocated for receiving that particular cartridge, however, each compartment in the array is capable of storing one of cartridges 30, 50, or 70. Thus, fixed numbers of storage compartment need not be allocated to each cartridge type.

The data library system has a control program that is capable of tracking the storage location of each cartridge in the array. The control program is provided with a lookup table that associates each cartridge with the type of drive mechanism that the cartridge requires. The walls of the cartridge library system within reach of the robotic arm is preferably covered with multimedia arrays like array 100.

The broad concept of the multimedia array that is described hereinabove pertains to the use of raised features, such as ramp 150 and boss 134, that cooperate with structural features on different cartridge designs to align the position of the cartridges within a given compartment. Thus, it is understood that this concept extends to additional cartridge designs other than those depicted in FIGS. 1-3 because other raised features can be used to align the position of the additional cartridges. Additionally, it is understood that the multimedia array can be used in data library systems other than tape drive systems, e.g., in optical disk libraries.

Those skilled in the art understand that the preferred embodiments, as hereinabove described, may be subjected to apparent modifications without departing from the true scope and spirit of the invention. The inventors, accordingly, hereby state their intention to rely upon the Doctrine of Equivalents, in order to protect their full rights in the invention.

We claim:

1. A data cartridge storage apparatus used to align a plurality of differently sized cartridges, said apparatus comprising:

at least one cartridge-receiving compartment including means for aligning a first cartridge in at least two dimensions with respect to said compartment; and means for aligning a second cartridge in said two dimensions with respect to said compartment when said first cartridge is not present in said compartment;

said first cartridge differing in size from said second cartridge in at least one of said two dimensions;

said first cartridge aligning means and said second cartridge aligning means including sidewalls of said compartment having means for gravity-centering of said first cartridge and said second cartridge along a width dimension as one of said two dimensions, said first cartridge and said second cartridge differing from one another in their respective width dimensions;

said gravity-centering means including each of said sidewalls having a ramp descending from said sidewall towards a center of said compartment.

2. The apparatus as set forth in claim 1 wherein said compartment includes means for aligning a third cartridge in said two dimensions with respect to said compartment, said third cartridge differing in size from said first cartridge in at least one of said two dimensions and differing in size from said second cartridge in the other of said two dimensions.

3. The apparatus as set forth in claim 1 wherein said first means and said second means for aligning include means for adjusting respective positions of said first cartridge and said second cartridge in a third dimension with respect to said compartment.

4. The apparatus as set forth in claim 3 wherein said adjusting means includes a sidewall ramp having a stairstep face.

5. The apparatus as set forth in claim 1 including a plurality of said compartments each having respective forwardmost surfaces.

6. The apparatus as set forth in claim 5 wherein one of said two dimensions for each compartment is a width dimension across said forwardmost surface, said width dimension presenting a central point.

7. The apparatus as set forth in claim 6 including means for holding a plurality of cartridges within said plurality of compartments with the respective forward surface of each cartridge extending forwardly to meet a common datum line drawn through space a fixed distance forward from each central point.

8. The apparatus as set forth in claim 7, each of said cartridges being centered with respect to said datum line when placed within one of said compartments.

9. The apparatus as set forth in claim 1 wherein said ramp has an arcuate surface.

10. The apparatus as set forth in claim 9 wherein said arcuate is concave towards said center of said compartment.

11. The apparatus as set forth in claim 1 wherein said first cartridge aligning means and said second cartridge aligning means include a rear wall of said compartment defining a depth dimension as one of said two dimensions, said rear wall including means for contacting a first rearward surface of said first cartridge to position a first forward surface of said first cartridge a fixed distance forward from said compartment, and for meeting a second rearward surface of said second cartridge to position a second forward surface of said second cartridge at said fixed distance forward from said compartment.

12. The apparatus as set forth in claim 11 wherein contacting means includes a boss raised forwardly from said rear wall at a sufficient height for a forward boss surface to contact said first cartridge.

13. The apparatus as set forth in claim 12 wherein said meeting means includes said sufficient height being effective for permitting said second cartridge to pass beneath said boss and meet said rear wall exclusive of said boss.

14. The apparatus as set forth in claim 1 including means for detachably hanging said compartment from a supportive wall.

15. The apparatus as set forth in claim 1, said apparatus having no moving parts.

16. A method of using a single compartment to at different times store a variety of differently sized cartridges for presentment to a robotic arm, said method comprising the steps of:

providing a compartment capable of holding one at a time a variety of differently sized cartridges with forward surfaces of said cartridges positioned in central alignment with respect to a center of width in said compartment and with said forward surfaces of said cartridges extending forward from said compartment across a fixed distance, said compartment including sidewalls, each one of said sidewalls having a ramp descending from said one towards a center of said compartment for gravity-centering a first cartridge and a second cartridge along a width dimension, said first cartridge and said second cartridge differing from one another in their respective width dimensions;

inserting a first cartridge having a first forward surface into said compartment by action of a robotic arm, said first cartridge having a width dimension and a first depth dimension;

removing said first cartridge from said compartment by action of said robotic arm;

placing a second cartridge having a second forward surface into said compartment by action of said robotic arm, said second cartridge having a size differing from said first cartridge with respect to at least one of said width dimension and said depth dimension; and permitting said compartment to position said second forward surface in essentially the same position as said first forward surface was positioned when said first cartridge was inserted into said compartment.

17. A data cartridge storage apparatus used to align a plurality of differently sized cartridges, said apparatus comprising:

at least one cartridge-receiving compartment including:

means for aligning a first cartridge in at least two dimensions with respect to said compartment; and means for aligning a second cartridge in said two dimensions with respect to said compartment when said first cartridge is not present in said compartment;

said first cartridge differing in size from said second cartridge in at least one of said two dimensions;

said first cartridge aligning means and said second cartridge aligning means including sidewalls of said compartment having means for gravity-centering of said first cartridge and said second cartridge along a width dimension as one of said two dimensions, said first cartridge and said second cartridge differing from one another in their respective width dimensions;

said gravity-centering means including each of said sidewalls having a ramp descending from said sidewall towards a center of said compartment;

said first cartridge aligning means and said second cartridge aligning means including a rear wall of said compartment defining a depth dimension as one of said two dimensions, said rear wall including contacting means for contacting a first rearward surface of said first cartridge to position a first forward surface of said first cartridge a fixed distance forward from said compartment, and meeting means for meeting a second rearward surface of said second cartridge to position a second forward surface of said second cartridge at said fixed distance forward from said compartment;

said contacting means including a boss raised forwardly from said rear wall at a sufficient height for a forward boss surface to contact said first cartridge;

said meeting means including said sufficient height being effective for permitting said second cartridge to pass beneath said boss and meet said rear wall exclusive of said boss.

18. A method of using a single compartment to at different times store a variety of differently sized cartridges for presentment to a robotic arm, said method comprising the steps of:

providing a compartment capable of holding one at a time a variety of differently sized cartridges with forward surfaces of said cartridges positioned in central alignment with respect to a center of width in said compartment and with said forward surfaces of said cartridges extending forward from said compartment across a fixed distance, said compartment including a rear wall defining a depth dimension, said rear wall including contacting means for contacting a first rearward surface of said first cartridge to position a first forward surface of said first cartridge a fixed distance forward from said compartment, and meeting means for meeting a second rearward surface of said second cartridge to position a second forward surface of said second cartridge at said fixed distance forward from said compartment, said contacting means including a boss raised forwardly from said rear wall at a sufficient height for a forward boss surface to contact said first cartridge, said meeting means including said sufficient height being effective for permitting said second cartridge to pass beneath said boss and meet said rear wall exclusive of said boss;

inserting a first cartridge having a first forward surface into said compartment by action of a robotic arm, said first cartridge having a width dimension and a first depth dimension;

removing said first cartridge from said compartment by action of said robotic arm;

placing a second cartridge having a second forward surface into said compartment by action of said robotic arm, said second cartridge having a size differing from said first cartridge with respect to at least one of said width dimension and said depth dimension; and permitting said compartment to position said second forward surface in essentially the same position as said first forward surface was positioned when said first cartridge was inserted into said compartment.

* * * * *